May 11, 1943.   G. W. T. BIRD   2,318,584
APPARATUS FOR TEMPERING FLAT GLASS
Filed March 6, 1940   3 Sheets-Sheet 1

INVENTOR
George W. T. Bird
by
Dusey Cole & Garner Attorneys

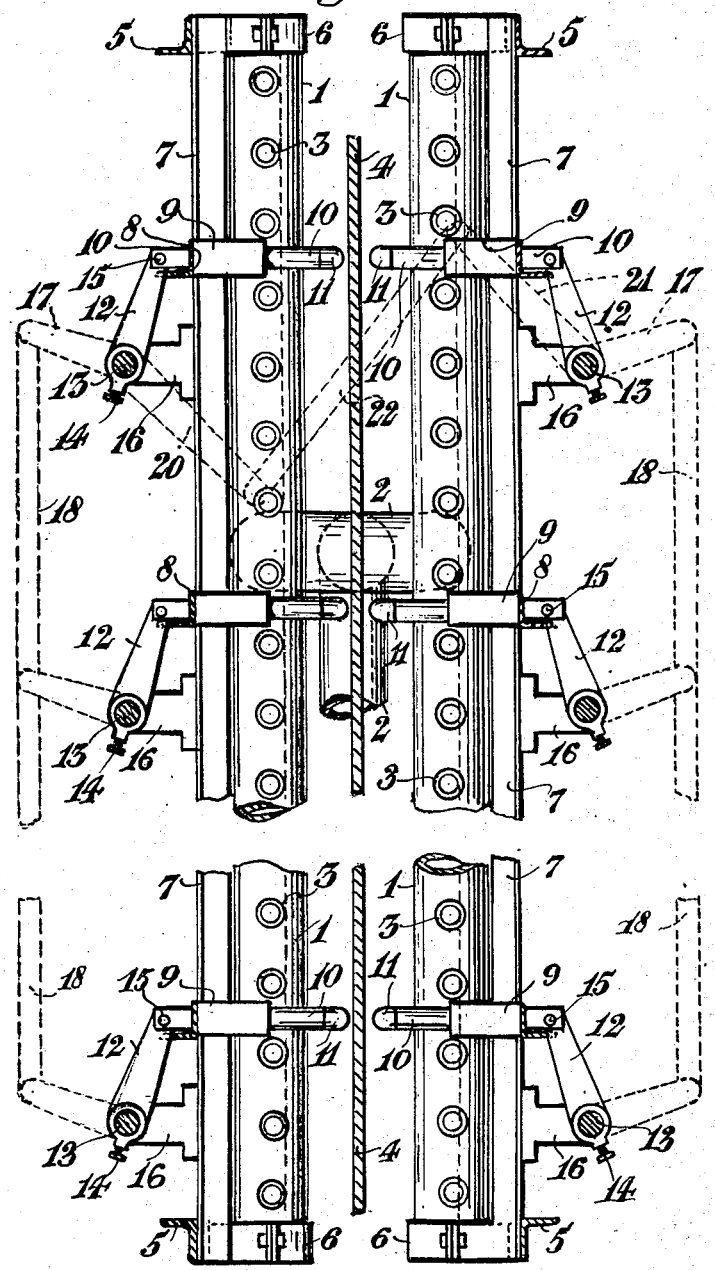

May 11, 1943. G. W. T. BIRD 2,318,584
APPARATUS FOR TEMPERING FLAT GLASS
Filed March 6, 1940 3 Sheets-Sheet 3
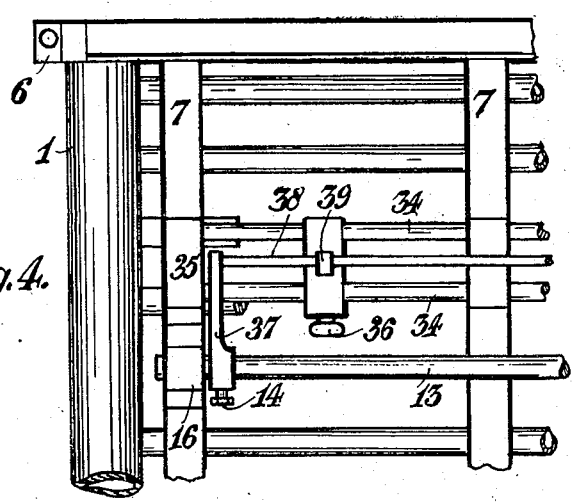
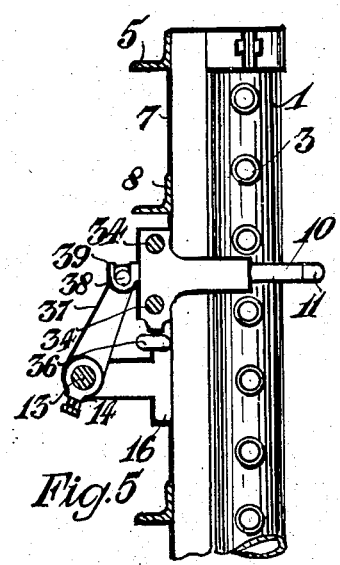
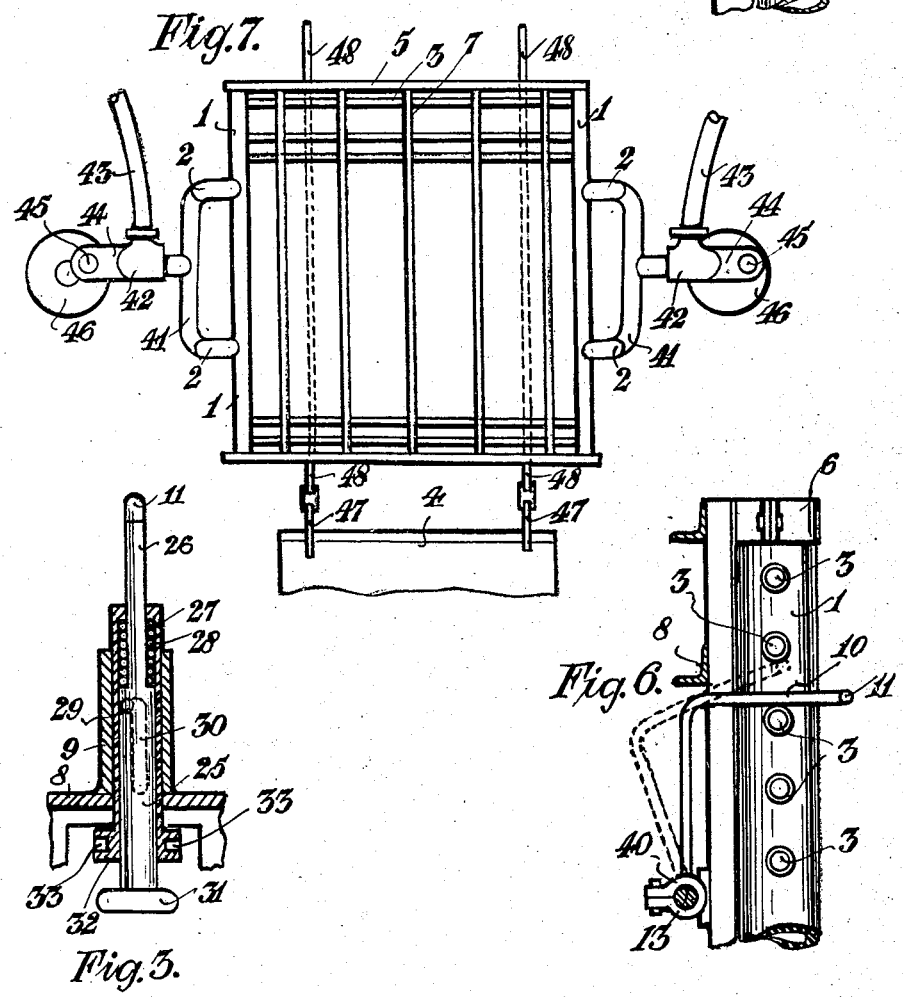

Patented May 11, 1943

2,318,584

UNITED STATES PATENT OFFICE 2,318,584

APPARATUS FOR TEMPERING FLAT GLASS

George William Terence Bird, Prescot, England, assignor to The American Securit Company, Wilmington, Del., a company of Delaware Application March 6, 1940, Serial No. 322,598
In Great Britain March 7, 1939

6 Claims. (Cl. 49—45)

This invention relates to the cooling of flat glass for tempering it by means of jets of cooling medium, and has for its object an improved means for steadying the glass during the operation of cooling.

When a sheet of glass is cooled by jets of cooling medium directed against its two surfaces, it is liable to be oscillated in directions perpendicular to its plane and to suffer damage or deformation or uneven cooling thereby. Devices for holding the sheet stationary which come into contact with it at its edges, or which remain stationary relatively to the glass, have been found harmful in causing uneven cooling.

The invention is applicable to the type of cooling apparatus in which the jets of cooling medium issue from a pair of jet frames which are oscillated relatively to the glass during the cooling operation in the customary way.

According to the invention, each of a pair of frames, oscillating with the jet frames, carries a plurality of pegs, and means are provided for moving the two sets of pegs towards each other, relatively to the jet frames, to positions in which the pegs of each set are close to but normally out of contact with the glass. The glass, therefore, is not held by the pegs, but its movement is restricted by them so that it cannot acquire a velocity sufficient to cause injury by reason of the inertia of the glass. Since the pegs partake of the oscillating movement of the jet frames, they do not shield spots on the glass from the cooling medium, and do not, therefore, cause local variations in the degree of temper of the glass.

In the accompanying drawings, which show by way of example an apparatus for carrying out the invention:

Figure 2 is a section along the line A—A of Figure 1;

Figure 3 is a section through an alternative form of peg and guide on an enlarged scale;

Figures 4 and 5 are views similar to those of Figures 1 and 2 showing an alternative form of the device;

Figure 6 is a view similar to that of Figure 5 showing an alternative device, and Figure 7 is a diagrammatic side view showing the jet frames (omitting the steadying devices) connected with oscillating means.

Figure 1:
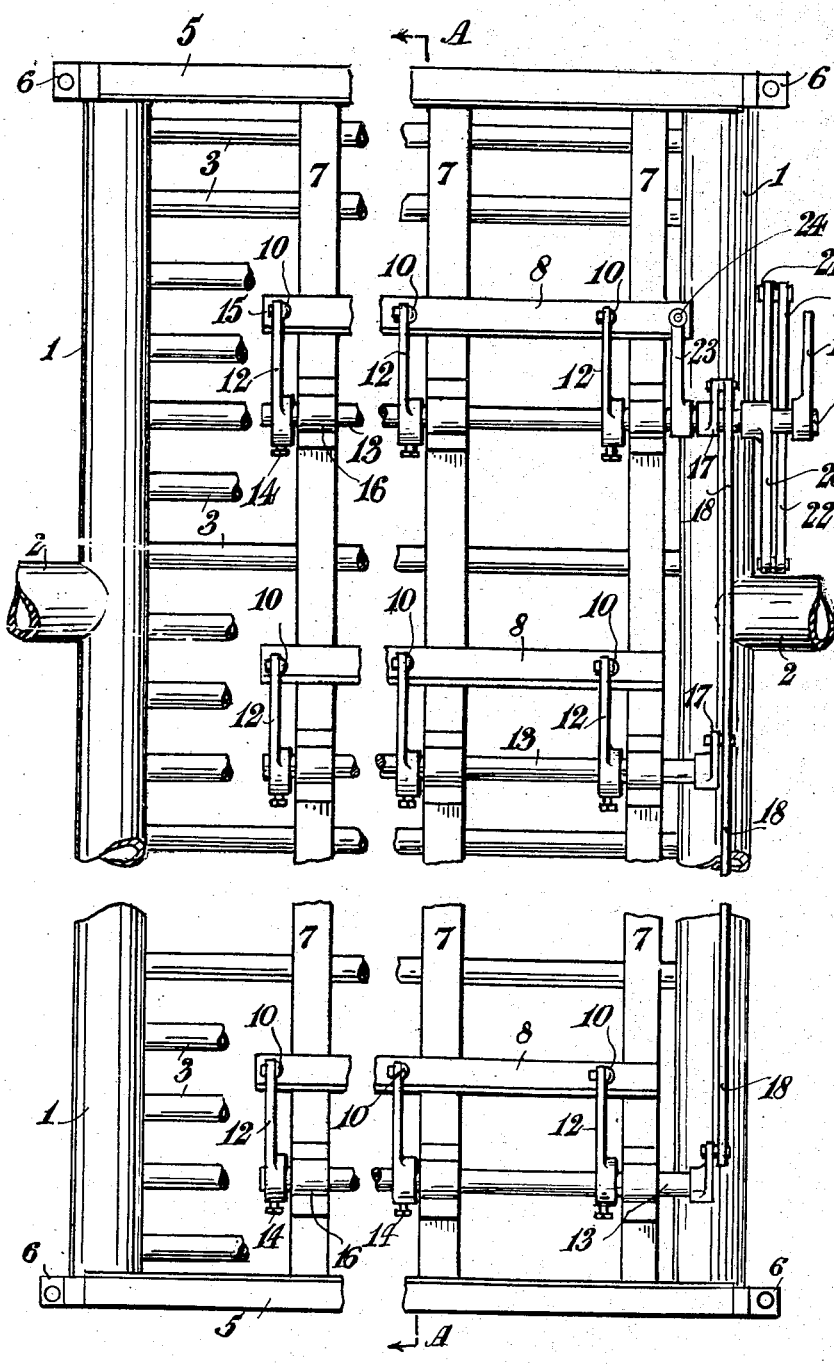
Figure 1 is a side view of a pair of jet frames with frame for pegs, parts being broken away.

Referring to the drawings, each jet frame consists of two vertical pipes 1, supplied with cooling medium by the pipes 2; between the pipes 1 extend jet tubes 3 provided with jet holes to direct the cooling medium against the glass 4. The glass is not shown in Figure 1, and the tubes 3 are broken away for the sake of clearness. The jet frames shown are designed for apparatus in which the glass is introduced between the frames from below or from above. They are mounted on an oscillating apparatus which is a known device, hereinafter briefly described with reference to Figure 7 of the drawings.

Frames for carrying the pegs are constructed and attached to the jet frames as follows: transverse angle irons 5 are attached to the upper and lower ends of the tubes 1 by clips 6. Vertical T-irons 7 are fixed to the angle irons 5 and carry angle irons 8. Guides 9 are welded at intervals to the angle irons 8, and pegs 10 are adapted to slide in the guides 9. The pegs carry tips 11 of material such as hard wood or the material known under the trade-mark "Bakelite," suitable for occasional contact with hot glass. At their other ends, the pegs 10 are pivoted at 15 to arms 12 fixed to transverse shafts 13 by set-screws 14. The arms 12 are slotted at the pivots 15 to permit the necessary movement and the horizontal flanges of the angle irons 8 are cut away to permit the arms 12 to take up the positions shown.

The shafts 13 are supported in bearing blocks 16 fixed to the T-irons 7. Each shaft 13 carries near its right hand end an arm 17 (shown in dotted lines in Figure 2), and all the arms 17 on each frame are coupled together by a bar 18. A handle 19 is fixed to one of the shafts 13 (the top shaft at the right in Figure 1) and, by turning this shaft by the handle counter-clockwise as seen on the left hand side of Figure 2, all the shafts 13 on this side are turned simultaneously so as to slide the pegs 10 to the left in their guides 9, till their tips are nearly flush with the inner sides of the tubes 3. A handle 19 may be provided for the shafts 13 on the other frame, or the two shafts, one on each frame, may be connected by the two arms 20 and 21 respectively, which are joined by a link 22 (shown in dotted lines in Figure 2). In this latter case, all the pegs 10 on the two frames can be withdrawn from the position shown, away from the glass by turning the single handle 19. In order that the pegs may be moved towards the glass to predetermined positions in which they are close to, but normally out of contact with the glass, the shaft 13 carrying the handle 19 is provided with an arm 23 having an adjustable stop 24 (Figure 1) adapted to bear against the angle iron 8 when the pegs are in the predetermined positions. The pegs 10 can be adjusted individually by means of the arms 12 and set screws 14.

In operation, before the glass is introduced between the jet frames, the pegs are withdrawn, so as to leave the space between the two sets of tubes 3 clear for introducing the glass with its tongs or other carrying means. Immediately the glass is in position, the handle or handles 19 is or are turned to bring the pegs into the position shown. The cooling medium is then supplied and the jet and peg frames are oscillated. The glass is then restricted in any oscillations perpendicular to its plane, and comes into momentary contact with one or more pegs before it can acquire a velocity sufficient to cause injury by reason of its contact with the pegs.

When the cooling operation is carried out on glass sheets smaller in size than the capacity of the jet frames, there may be pegs which, by reason of the oscillation of the frames, are moved to and fro past an edge of the glass sheet. In this case it may arise that pegs so placed strike the edge of the glass sheet, if the sheet is canted at the moment when the pegs are about to pass its edge. Pegs in positions where this may arise are therefore preferably made of the form shown in Figure 3, so that they may be withdrawn individually from the sheet by a movement which is supplementary to the movement imparted by the handle 19. Figure 3 shows on an enlarged scale a short length of angle iron 8, with a guide 9 fixed thereto. The peg consists of a rod 25, with a portion 26 of reduced diameter carrying the tip 11. The rod 25 is adapted to slide in a sleeve 27, which in turn is adapted to slide in the guide 9. A spring 28 in the sleeve 27 and surrounding the portion 26 tends to press the rod 25 so as to withdraw the peg from the glass. The rod 25 is held in the position shown by a pin 29 fixed to the rod and engaging a bayonet slot 30 in the sleeve 27. By a slight turn of the knob 31 on the rod 25, the peg is withdrawn from the glass by the spring 28, this movement being relative to the sleeve 27. The sleeve 27 carries a head 32 having two holes 33, and these holes are engaged by pins on the forked end of a lever 12. The peg, therefore, partakes of the movement imparted to all the pegs by turning the handle 19, but can be maintained always in a position well clear of the glass by allowing the rod 25 to slide outwards relatively to the sleeve 27.

As an alternative to the pegs shown in Figure 3, the form of device shown in Figures 4 and 5 may be used. In this the pegs are adjustable in position horizontally, so that they may be moved to a position to suit any size of glass sheet. The peg guides 9 are carried on two rods 34 held in blocks 35 fixed to the T-irons 7. The guides are adapted to slide along the rods 34 and to be fixed in any desired position between T-irons 7 by the set-screws 36. Two arms 37 are fixed to the shaft 13 at opposite sides of the frame by set screws 14, and carry between them a rod 38. The rod 38 engages the slotted ends 39 of all the pegs in a horizontal row, so that by turning the shafts 13, all the pegs may be moved into operative or inoperative position, whatever their positions.

Alternatively, as shown in Figure 6, the guides 9 may be dispensed with by mounting the pegs 10 directly on blocks 40 keyed to the shafts 13 so that, on turning the shafts 13, the pegs may be moved into the inoperative position shown in dotted lines. The pegs may be adjusted in position lengthways of the shafts by sliding them along the shafts.

Figure 7 shows diagrammatically a pair of jet frames with oscillating means and a sheet of glass about to be raised between the frames. The pipes 2 are connected through pipes 41 to elbow pieces 42 to which cooling medium is supplied by flexible pipes 43. Extensions 44 to the elbow pieces 42 engage crank-pins 45 on discs 46 which are rotated to oscillate the frames. The sheet of glass 4 is supported by tongs 47 and is drawn up between the frames by cables 48.

Having described my invention, I declare that what I claim and desire to secure by Letters Patent is:

1. Apparatus for cooling a sheet of glass for tempering it, comprising two cooling medium supply frames on opposite sides of the sheet of glass, each provided with jet holes adapted to direct cooling medium against the surfaces of the sheet, means for oscillating the two frames relatively to the sheet of glass, two oscillatable peg frames, one at each side of the sheet, connected respectively with the two supply frames, a plurality of pegs mounted on each peg frame having ends of small cross-section, means for simultaneously moving all the pegs of each frame towards and away from an operative position in which their tips are close to but out of contact with the glass sheet, and means adapted to displace individually at least one of the pegs in a direction at right-angles to the plane of the glass to occupy an inoperative position when the remaining pegs are in operative positions.

2. Apparatus for cooling a sheet of glass for tempering it, comprising two cooling medium supply frames on opposite sides of the sheet of glass, each provided with jet holes adapted to direct cooling medium against the surfaces of the sheet, means for oscillating the two frames relatively to the sheet of glass, two oscillatable peg frames, one at each side of the sheet, connected respectively with the two supply frames, a plurality of pegs mounted on each peg frame having ends of small cross-section, means for adjusting the pegs in a direction parallel to the plane of the glass, means for simultaneously moving all the pegs of each frame towards and away from an operative position in which their tips are close to but out of contact with the glass sheet, and means adapted to displace individually at least one of the pegs in a direction at right-angles to the plane of the glass to occupy an inoperative position when the remaining pegs are in operative positions.

3. Apparatus for cooling a sheet of glass for tempering it, comprising two cooling medium supply frames, in fixed spaced relationship on opposite sides of the sheet of glass, each provided with jet holes adapted to direct cooling medium against the surfaces of the sheet, means for oscillating the two frames relatively to the sheet of glass, two peg frames, connected respectively with the two supply frames, so as to oscillate with them, a plurality of pegs mounted on each peg frame having ends of small cross-section with a capacity for movement relatively to the connected supply frame from a position in which their tips are substantially in the plane of the jet holes into a position in which their tips are close to but out of contact with the glass sheet, means connecting all the pegs of at least one peg frame adapted to effect the said movement of all the pegs on said last-mentioned frame simultaneously, and means for independently adjusting the position of the last-mentioned individual pegs relative to the plane of the jet holes.

4. Apparatus for cooling a sheet of glass for tempering it, comprising two cooling medium supply frames in fixed spaced relationship on opposite sides of the sheet of glass, each provided with jet holes adapted to direct cooling medium against the surfaces of the sheet, means for oscillating the two frames relatively to the sheet of glass, two peg frames connected respectively with the two supply frames, so as to oscillate with them, a plurality of pegs mounted on each peg frame having ends of small cross-section with a capacity for movement relatively to the connected supply frame from a position in which their tips are substantially in the plane of the jet holes into a position in which their tips are close to but out of contact with the glass sheet, and means connecting all the pegs of both peg frames adapted to effect the said movement of all the pegs simultaneously.

5. Apparatus for cooling a sheet of glass for tempering it, comprising two cooling medium supply frames, in fixed spaced relationship on opposite sides of the sheet of glass, each provided with jet holes adapted to direct cooling medium against the surface of the sheet, means for oscillating the two frames relatively to the sheet of glass, two peg frames connected respectively with the two supply frames, so as to oscillate with them, a plurality of pegs mounted on each peg frame having ends of small cross-section with a capacity for movement relatively to the connected supply frame from an inoperative position in which their tips are substantially in the plane of the jet holes into an operative position in which their tips are close to but out of contact with the glass sheet, means connecting all the pegs of each peg frame adapted to effect the said movement of all the pegs on the frame simultaneously, and means adapted to displace individually at least one of the pegs in a direction at right-angles to the plane of the glass to occupy an inoperative position when the remaining pegs are in operative positions.

6. Apparatus for cooling a sheet of glass for tempering it, comprising two cooling medium supply frames, in fixed spaced relationship on opposite sides of the sheet of glass, each provided with jet holes adapted to direct cooling medium against the surfaces of the sheet, means for oscillating the two frames relatively to the sheet of glass, two peg frames, connected respectively with the two supply frames, so as to oscillate with them, a plurality of pegs mounted on each peg frame having ends of small cross-section with a capacity for movement relatively to the connected supply frame from a position in which their tips are substantially in the plane of the jet holes into a position in which their tips are close to but out of contact with the glass sheet, means connecting all the pegs of at least one peg frame adapted to effect simultaneously the said movement of all the pegs on said last-mentioned frame in a direction perpendicular to the plane of the sheet of glass, means for independently adjusting the position of the last-mentioned individual pegs relative to the plane of the jet holes, and additional means for adjusting the pegs on said last-mentioned frame in a direction parallel to the plane of the glass.

GEORGE WILLIAM TERENCE BIRD.